United States Patent
Jason, Jr.

(10) Patent No.: US 7,508,825 B2
(45) Date of Patent: Mar. 24, 2009

(54) DATA PACKET CLASSIFICATION

(75) Inventor: James L. Jason, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1293 days.

(21) Appl. No.: 10/213,365

(22) Filed: Aug. 5, 2002

(65) Prior Publication Data

US 2004/0022243 A1    Feb. 5, 2004

(51) Int. Cl.
    *H04L 12/56* (2006.01)
(52) U.S. Cl. ............................ 370/389
(58) Field of Classification Search ............... 370/389, 370/392, 230, 254; 707/100; 709/238
    See application file for complete search history.

(56) References Cited

U.S. PATENT DOCUMENTS

| | | | | |
|---|---|---|---|---|
| 5,574,910 A | * | 11/1996 | Bialkowski et al. | 707/1 |
| 5,917,821 A | * | 6/1999 | Gobuyan et al. | 370/392 |
| 6,490,592 B1 | * | 12/2002 | St. Denis et al. | 707/102 |
| 6,691,168 B1 | * | 2/2004 | Bal et al. | 709/238 |
| 6,975,628 B2 | * | 12/2005 | Johnson et al. | 370/389 |
| 7,023,859 B2 | * | 4/2006 | Paul et al. | 370/400 |
| 2002/0009076 A1 | * | 1/2002 | Engbersen et al. | 370/389 |
| 2002/0133586 A1 | * | 9/2002 | Shanklin et al. | 709/224 |
| 2002/0161914 A1 | * | 10/2002 | Belenki | 709/235 |
| 2002/0188720 A1 | * | 12/2002 | Terrell et al. | 709/225 |
| 2003/0120622 A1 | * | 6/2003 | Nurmela et al. | 706/47 |

OTHER PUBLICATIONS

Gupta et al. Algorithms for Classification. IEEE. 2001. pp. 1-29.*

* cited by examiner

*Primary Examiner*—Anh-Vu H Ly
(74) *Attorney, Agent, or Firm*—Fish & Richardson P.C.

(57) ABSTRACT

This specification describes technologies relating to classifying data packets based on general property ranges. An interval tree is constructed to represent the applicability of rules to non-overlapping ranges of a data classification property. The interval tree can be a binary tree such as a balanced binary tree or red-black tree. To determine which rules apply to a data packet, the data packet property is compared to the intervals in the tree to find a match. To balance the time and space complexity, a heuristics based approach is used for classifying data packets based on general property ranges of more than one data classification property.

8 Claims, 8 Drawing Sheets

DATA PACKET CLASSIFICATION

This description relates to data packet classification.

BACKGROUND

Typical network administrators desire the ability to control the processing of information based on its properties, for example, to give higher or lower priority to packets of data that have certain properties. A user may have exceeded an allotted usage, and thus the administrator may want packets originating from him to be given a lower priority when traveling through the network. Likewise, it may be of high importance that data from a certain source reach a certain destination, and the administrator will want this reflected in the priority given to these data.

Components between two points on a network process packets of data based on the properties of those data packets. These properties may be, but are not limited to, fields in the headers of the data packets. Such properties may include, but are not limited to, the source address of the data packet, the destination address, the protocol used by the data packet (such as TCP or UDP), and/or ports. For example, a router 10, as shown in FIG. 1, can perform the function of routing data from one piece of a network, or subnet 12, to a second subnet 14. By comparing the destination address of a data packet to a routing table, the router 10 determines where to send the data.

As shown in FIG. 2, filters 16 can be employed to aid in the processing of the data packets. By using masking techniques, or blocking out certain portions of data packet properties (such as a certain portion of the destination address), it is possible to determine the source or destination subnet of the packet. Thus the data packet can be classified and action can be taken based on which subnet it originated from or was destined for. Likewise, a packet could be classified by comparing it to a single port or to the set of all ports.

Specialized hardware solutions can be used to classify data packets based on property ranges that do not fit into these clearly delineated categories. For example, data packet classification based on an address range that spans more than one subnet can be implemented with hardware that can logically "and" a set of 32-bit integers and indicate the first bit position that is set in all of the 32-bit integers.

DRAWINGS

DETAILED DESCRIPTION

Figure 1:
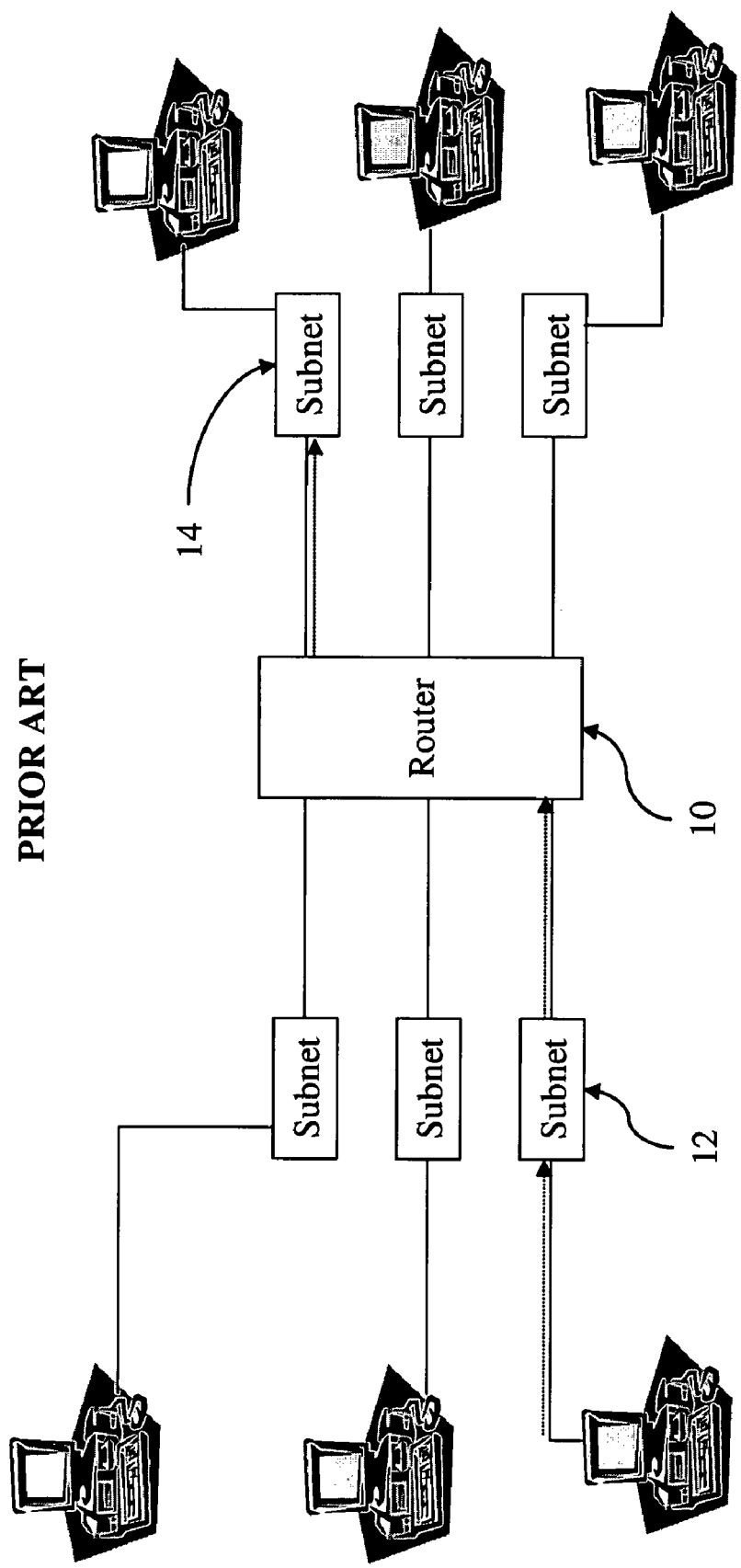
FIG. 1 is a block diagram of a network.
Figure 2:
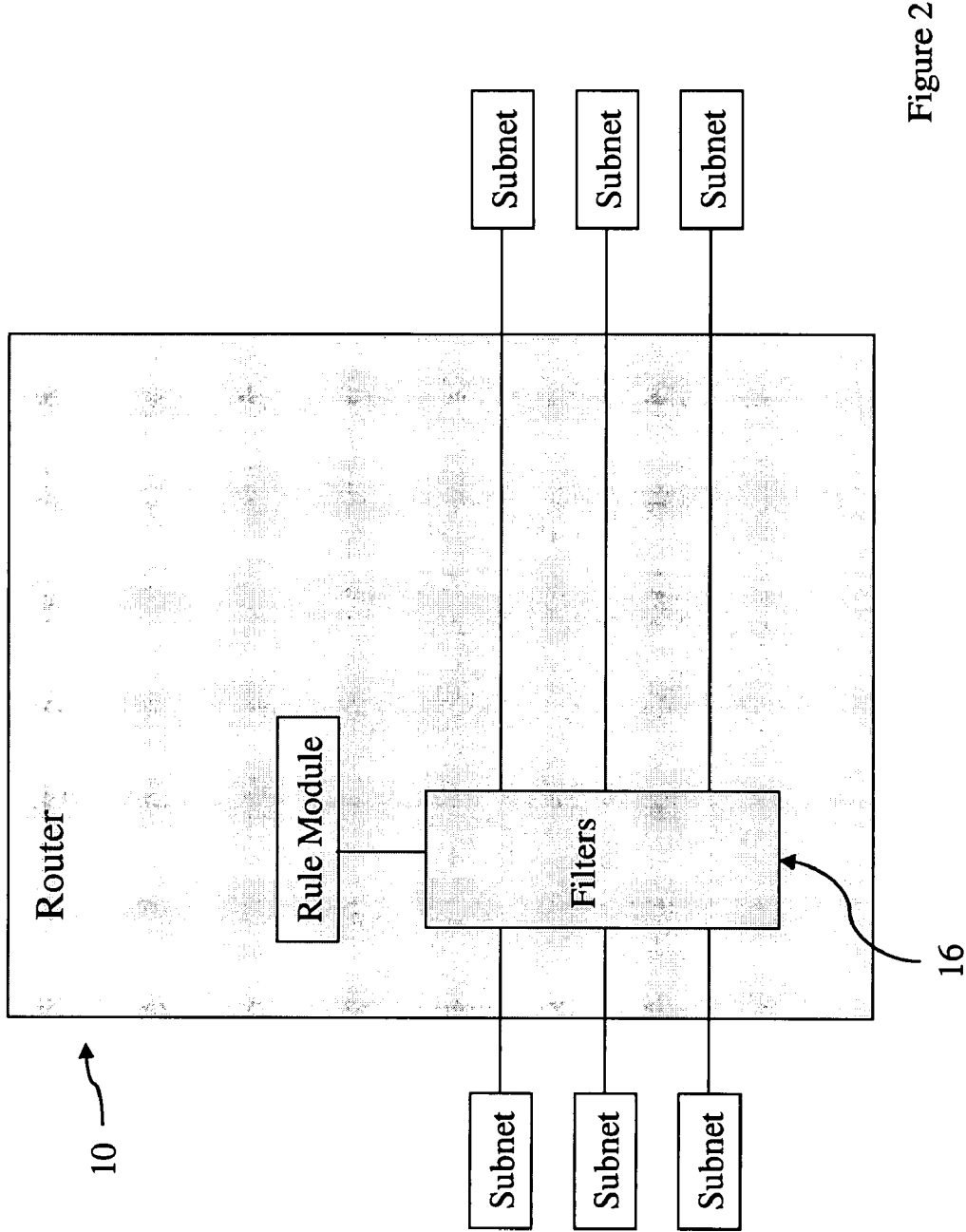
FIG. 2 is a block diagram of a router interfacing with subnets.
Figure 3:
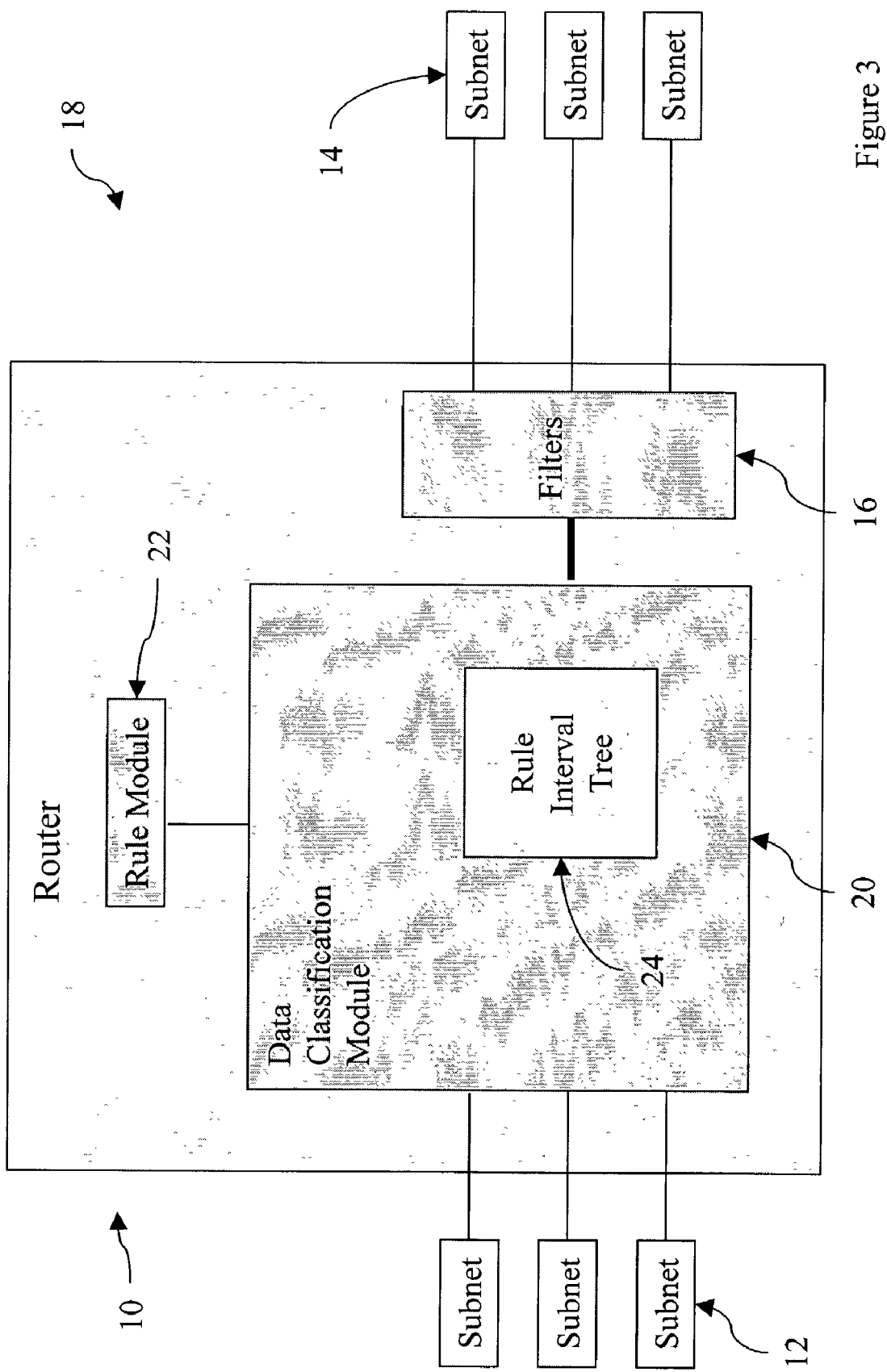
FIG. 3 is a block diagram of a router interfacing with subnets.

FIG. 3 shows a system 18 for classifying data packets based on general property ranges. A network device, such as a router 10, manages the flow of data packets to and from different subnets (i.e. 12, 14) on a network. The router 10 includes a data classification module 20 for classifying data packets based on rules that are provided by a rule module 22. The data classification module 20 interprets the rules by constructing a data structure, such as a tree data structure 24, that represents the rules. A rule can be a condition and a corresponding result, such as "if the packet's header value for source address matches a certain range, then encrypt the packet using this algorithm and key." A rule can be implemented by a filter 16. In the above example, the condition would be the filter 16, where the filter specifies values to compare against the packet's header values to determine if there is a match. The rule would then be "if the packet matches this filter (i.e. the source address is in the range specified by the filter) then apply the corresponding result." To satisfy the rule, the appropriate value in the header of the packet must be within the range designated by the corresponding filter.

The tree data structure can be implemented in a computer memory, or transmitted as a data signal embodied in a carrier wave. A data packet is compared to the rules, as represented by the tree data structure 24, to see which rules apply to it. The data packet is tagged to represent the applicability of the rules, and processed accordingly.

Typical data classification properties are the source and destination addresses of the data packet. A general range of source or destination addresses includes ranges that do not entirely encompass a subnet as well as ranges that span more than one subnet or portions thereof. Another typical data classification property is a port designation. General port ranges includes those with more than one port, but not necessarily all ports. Still another example of a typical data classification property is Internet Protocol (IP) type, such as TCP, UDP, or wild-carded. Various other data classification properties can also be used.

Figures 4A, 4B:
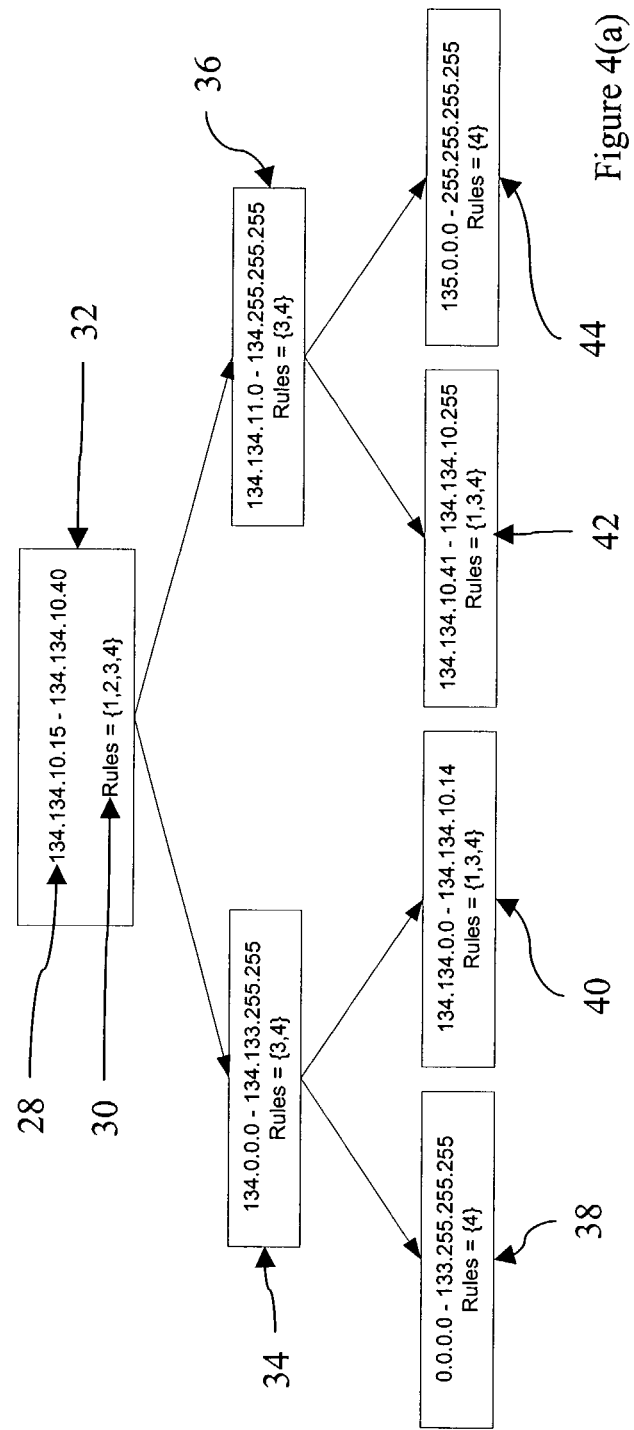
FIG. 4(a) is a tree data structure for a set of rules.
FIG. 4(b) is the set of rules corresponding to the tree data structure of FIG. 4(a)

A tree data structure 26, as shown in FIG. 4(a), represents a set of rules, shown in FIG. 4(b), as a set of non-overlapping intervals. In this example, a binary tree is used, and each node of the tree represents a range, or interval, of source addresses 28 and a subset of rules 30 that apply to that range of addresses. The top of the tree is the root interval 32. The root interval 32 is roughly the median interval, and the leaf intervals are those nodes that do not have any nodes branching from them. The root interval 32 is determined by an algorithm that is used to keep the binary tree balanced, where the distance between the root interval 32 and any leaf interval is not too far when compared to the distance between the root interval 32 and other leaf intervals. If the rules change such that an interval is added or removed, the tree may need to be rebalanced and the root interval 32 may change.

A left child interval 34 represents an interval in which the addresses are lower than the start of the root interval 32. A right child interval 36 represents an interval in which the addresses are higher than the end of the root interval 32. Each of these child intervals might be a parent interval for another pair of child intervals 38 and 40, 42 and 44. In the case of intervals for ranges below the range of the root interval, the left child interval 38 represents an interval in which the addresses are lower than the start of the first child interval 34, while the right child interval 40 represents addresses between the first child interval 34 and the root interval 32. In the case of intervals for ranges above the range of the root interval, the right child interval 44 represents an interval in which the addresses are higher than the end of the first child interval 36, while the left child interval 42 represents addresses between the first child interval 36 and the root interval 32. Successive levels of child intervals are constructed similarly.

Figure 5:
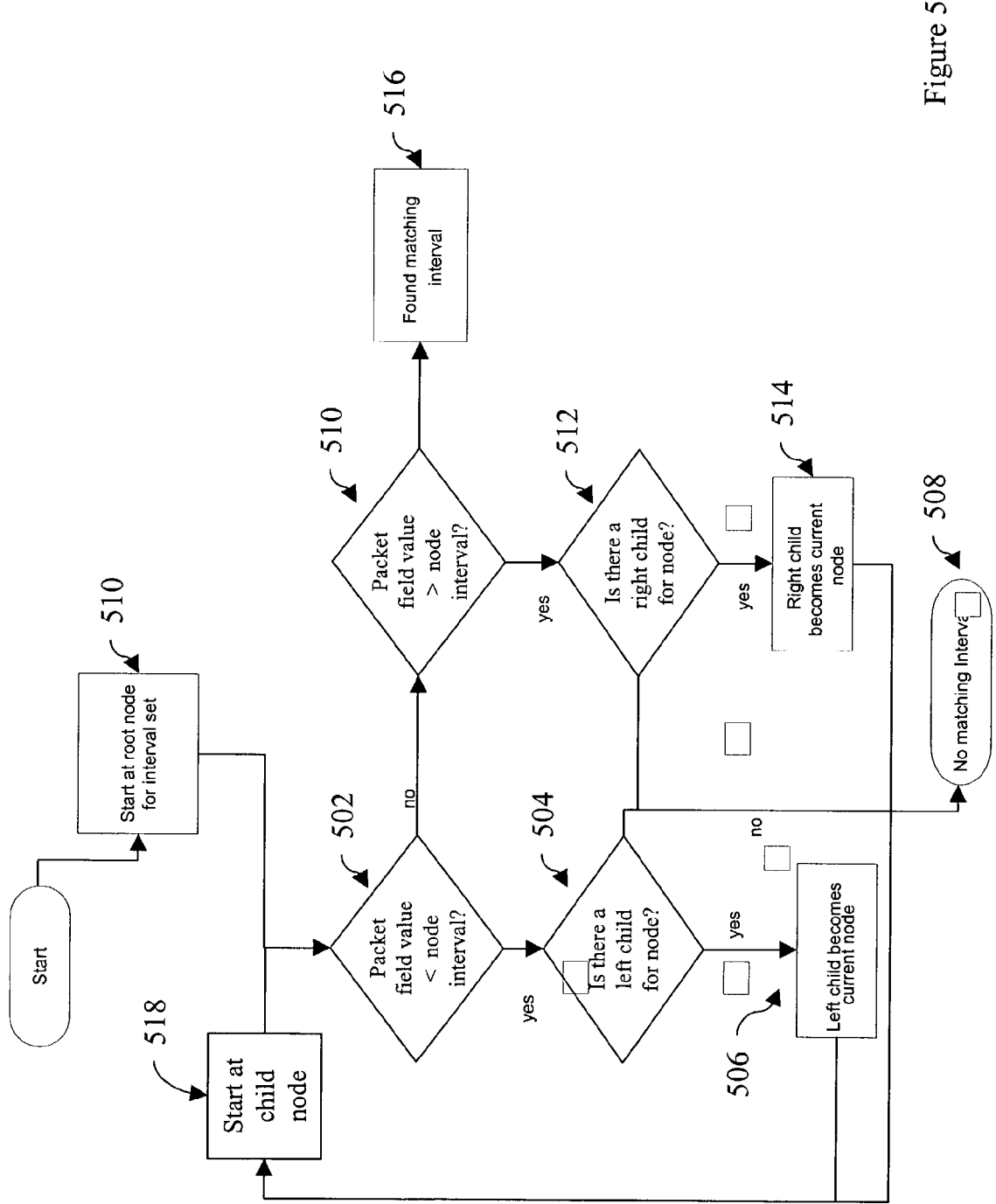
FIG. 5 is a flowchart of a method of searching a tree data structure.

When a data packet is received, it is compared to the tree structure as shown in FIG. 5. The data classification property of the data packet is compared to the root interval 32. If the value of the packet property is lower than any of the values in the root interval (502) and a left child interval exists (504), the left child interval is assigned as the current interval (506). If no left child exists, the packet property value does not fit in any interval, and the packet satisfies none of the rules (508). If the value of the packet property is higher than any of the values in the root interval (510), and a right child interval exists (512), the right child interval is assigned as the current interval (514). If no right child exists, the packet property value does not fit in any interval, and the packet satisfies none of the rules (508). If the packet property value is not greater or less than any value in the root interval, then it must be in the root interval. The packet thus satisfies the rules corresponding to that interval (516). If either a right or left child interval was assigned as the current interval, then the comparison is repeated for that interval (518). Similar iterations are made, until it is determined that the packet property value either fits in an interval (516), or fits in no interval (508).

If the data packet satisfies one or more rules, it is tagged appropriately based on which rules it satisfies. One way to do this is for each interval to have a way of representing the filters that match a particular interval. For example, the interval the data packet matched can correspond to a set of filter IDs or a bit vector indicating which filters are matched to the interval. The data packet will then be processed by one, some, or all of the rules to which it is matched. For example, the packet may be given a higher or lower priority based on the rules it satisfied, and thus will be scheduled differently than packets satisfying different rules. If the data packet satisfied none of the rules, it will not be tagged, and thus will not be processed according to the rules.

The tree-structure used determines the time complexity of a search through the tree. For example, the tree can be a balanced binary tree with n intervals. The time complexity of a one-property balanced binary tree, where no leaf interval is more than a certain amount farther from the root interval than any other leaf interval, can be on the order of log n. Another example of a tree-structure is a red-black tree, where no leaf interval is more than twice as far from the root interval than any other. The time complexity of a red-black tree with n intervals can be on the order of 2 log n. Therefore, if the rule set included 1000 non-overlapping intervals, it would take at most 10 comparisons for a balanced binary tree and at most 20 comparisons for a red black tree to locate the matching interval.

For rules that encompass more than one data classification property, trees can similarly be generated for each of the other data classification properties. Each of these trees can be searched separately. Alternatively, each interval in the first tree can include a reference to a tree for a second data classification property, each interval in the second tree can include a reference to a tree for a third data classification property, and so on.

A data packet would be compared to each of these trees, and would be tagged appropriately based on which rules it satisfied for each of the data classification properties. One way to do this is for each interval to have a way of representing the filters that match a particular interval. For example, the interval can be matched to a set of filter IDs or a bit vector indicating which filters are matched to the interval. For each data classification property in which a data packet matches an interval then, there is a potential set of filter matches indicated by the filter IDs or bit vector. It is then determined which filters are indicated by all of the intervals that are matched. This can be done, for example, by doing a set intersection of the rule sets, or logically "and"ing the bit vectors. It may be necessary to dedicate hardware to logically "and"ing bit vectors.

As the number of characteristics compared increases, the number of tree intervals also increases. This results in increased consumption of computing resources, such as memory, in order to decrease the amount of time it takes to compare the properties to the rules (time complexity). The consumption of memory can be referred to as space complexity. For example, an ordered list of filters can require 4 bytes of memory per rule. Intervals in the interval set, on the other hand, can require more than 32 bytes each. And there are potentially twice as many intervals as there are rules for the interval set. A balance between the time complexity of the search and the space complexity can be struck by using a heuristics based approach to searching.

Figure 6:
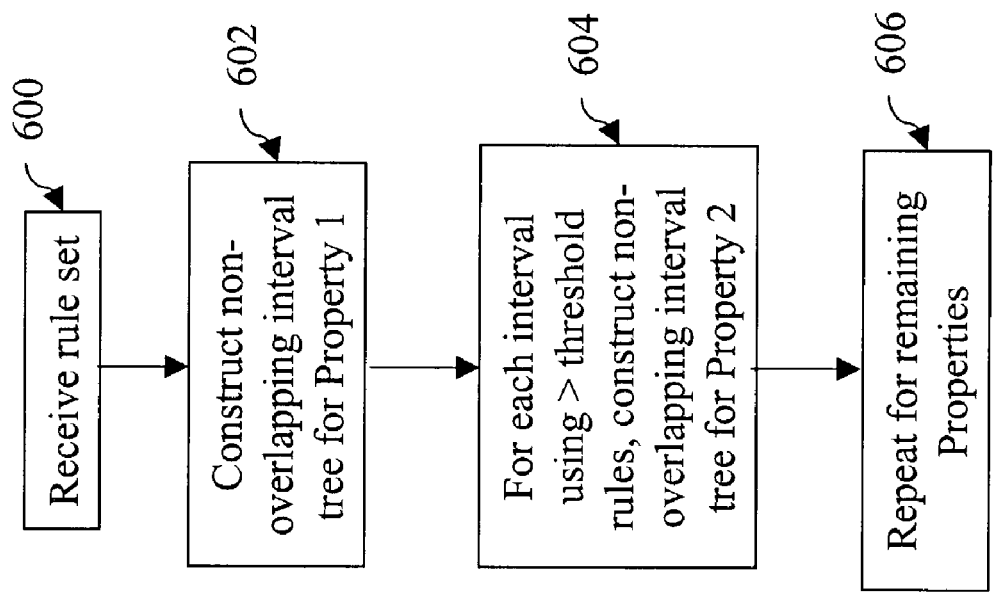
FIG. 6 is a flowchart of a heuristics based method of generating a tree data structure.

FIG. 6 shows a method of constructing a tree structure for more than one data classification property. First, an interval tree is created for a first data classification property (600). For each interval in the first tree, if the number of rules that could potentially apply for that interval is high (e.g., exceeds a threshold number of rules), then that interval will refer to another tree data structure representing a second data classification property (602). This threshold value can also be heuristically determined. For example, the size of the trees and the number of intervals can be monitored. If the amount of memory consumed by them grows too large, the threshold can be adjusted. Thus the threshold can be dynamically changed as the rules change, to maintain the desired balance of time and space complexity. This heuristic determination can be performed by software.

If, on the other hand, the number of rules that potentially apply is small (e.g., does not exceed the threshold) then searching one-by-one through an ordered list of rules to see which ones apply for each data classification property will not be time intensive. Thus it is unnecessary to create a tree structure for another data classification property. Instead, the interval will refer, to an ordered list of rules (604). If the tree structure is to represent more than two data classification properties, this method is repeated for each of the intervals of the trees created in 602 (606).

Figures 7A, 7B:
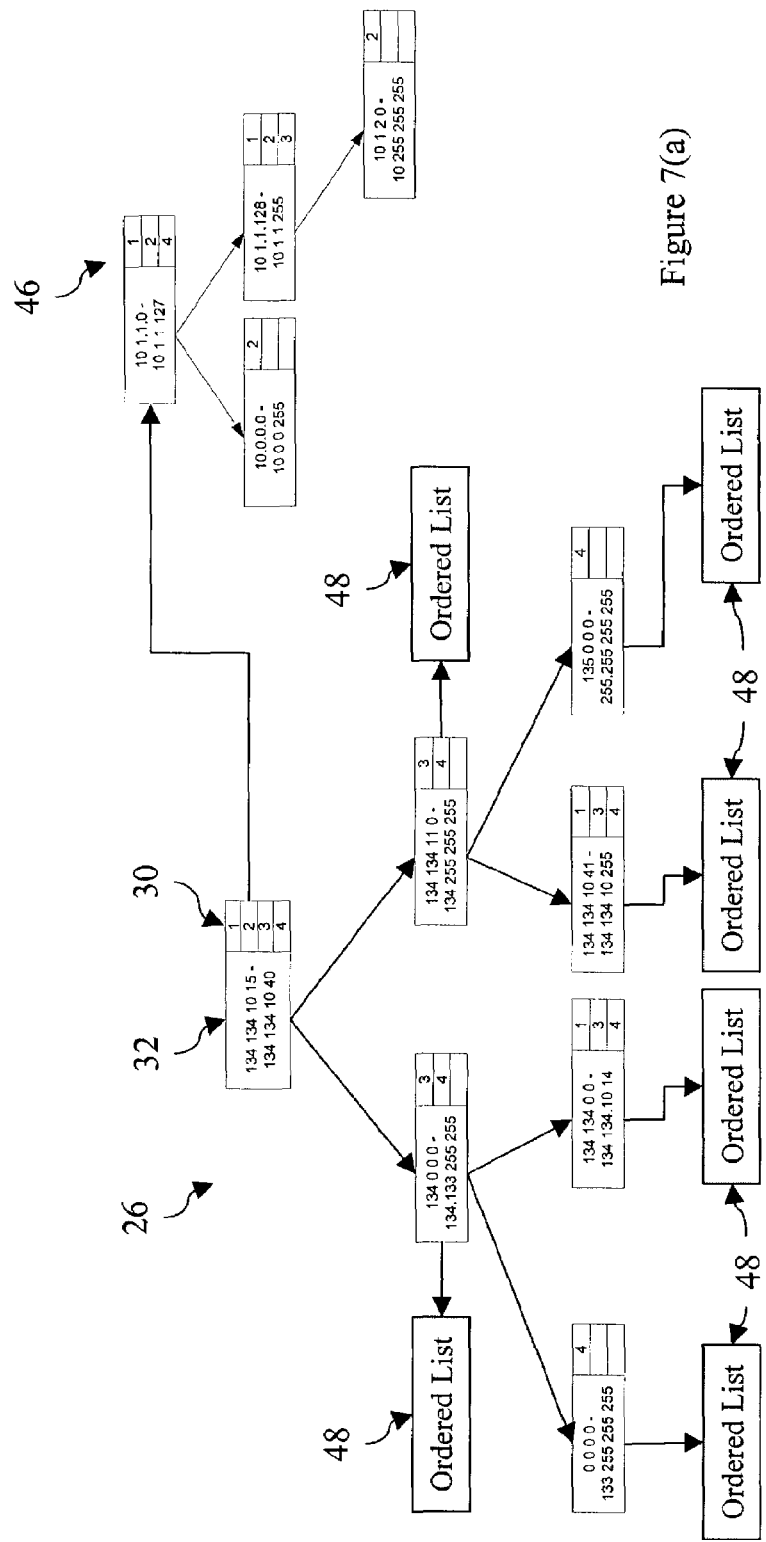
FIG. 7(a) is a tree data structure for a set of rules.
FIG. 7(b) is the set of rules corresponding to the tree data structure of FIG. 7(a)

An example is shown in the tree data structure in FIG. 7(a), which corresponds to the rules in FIG. 7(b). A first tree structure 26 is generated for the rules as they correspond to a source address data classification property. In this example, the threshold number of rules is chosen to be three. The root interval of the first tree 32 is an interval where four rules 30 could potentially apply. This interval then refers to a second tree data structure 46 for a second data classification property, here, destination address. None of the other intervals in the first tree indicate that more than three rules potentially apply. They then contain references to ordered lists of rules 48.

Figure 8:
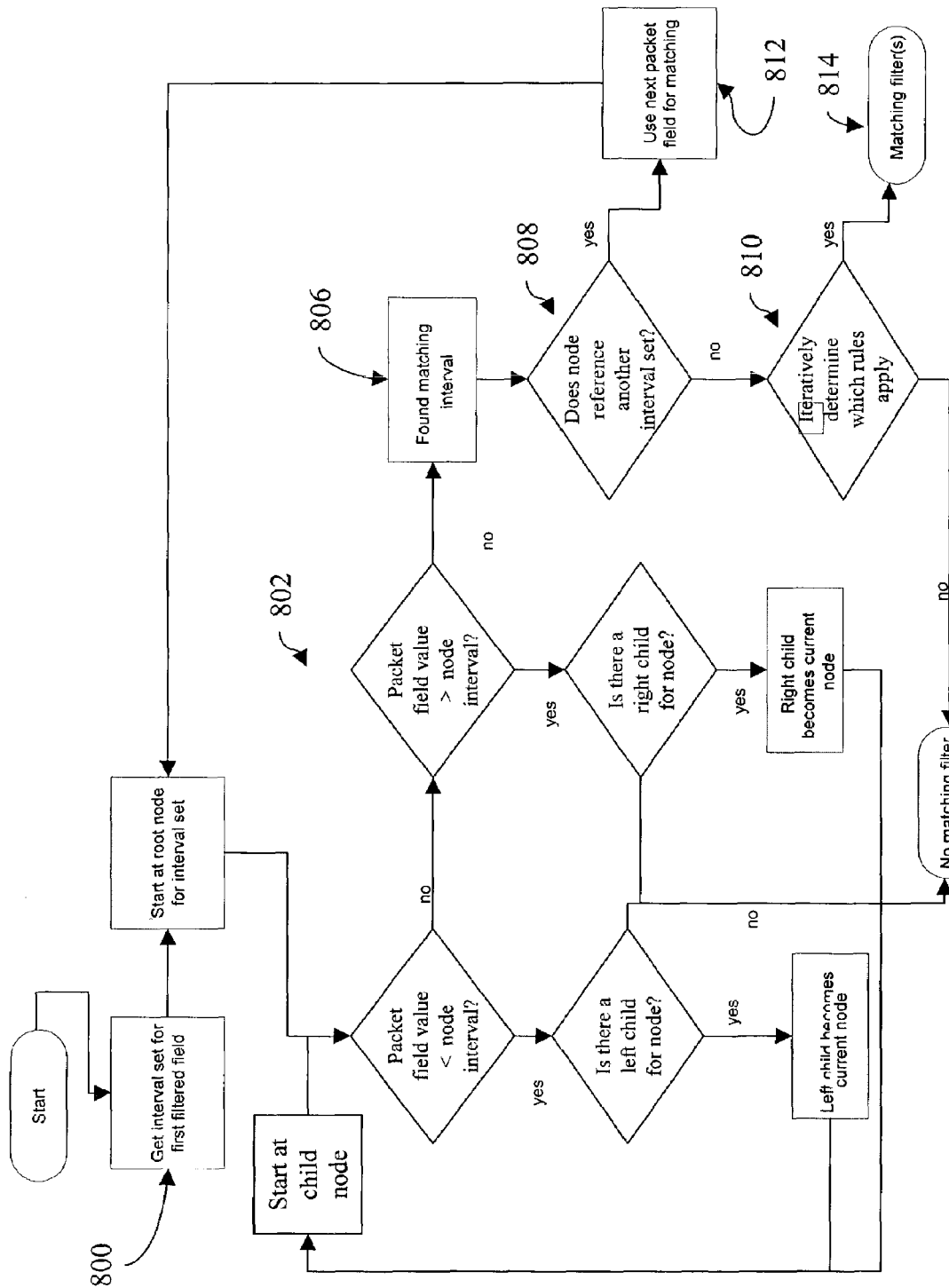
FIG. 8 is a flowchart of a method of searching a tree data structure.

FIG. 8 illustrates a method of heuristically comparing multiple data packet properties to a tree structure. First, the data packet is compared to a tree structure for a first data packet property (800). It is determined whether the first data packet property matches an interval in the first tree structure. This portion of the method is similar to that shown in FIG. 5, and is represented by shaded boxes in FIG. 8 (802). If the first property of the data packet does not match any interval of the first interval tree, then no rules match the data packet (804). If there is an interval in the first tree that matches the first property of the data packet (806), the packet is compared to a second data packet property (808). If the matching interval in the first tree indicated that the packet could satisfy a number of rules equal to or less than the threshold value, that interval will not refer to any other tree structures. Instead, it will refer to an ordered list of rules (810). The second property of the data packet, as well as any other properties being tested, will be compared to the ordered list of rules to find a match, if any. The rules that match the data packet will determine how the data packet is processed. If there is no rule that matches all of the, data packet properties, then no filters match the data packet (804).

If the interval in the first tree indicated that the packet could satisfy a number of rules greater than the threshold, that interval will refer to a second non-overlapping tree structure representing the second data packet property (812). The data packet is compared to the second interval tree in a similar manner as for the first interval tree (802). If there is no rule that matches all of the data packet properties (804), then no filters match the data packet. If there is an interval in the second tree that potentially matches, and there is no third property to be tested, then the data packet matches the set of rules in the second interval (806). If there is a third property to be tested, the interval will either refer to another tree, or an ordered list (810 or 812). As described above, this depends on the number of potentially applicable rules compared to the threshold value. This method is repeated until it is determined that either a set of rules matches each property of the data packet (814), or that no rules match all the properties of the data packet (804).

In the worst case, the space complexity of this method is on the order of $n^m$, where n is the number of rules, and m is the number of data classification properties. However, it is likely to be much lower than this. The worst case assumes that every rule overlaps every other rule. In general, though, only small subsets of the rules overlap, because, in practice, the rules have a low degree of correlation. The interval tree for the first data classification property will primarily contain intervals that refer to ordered lists of rules rather than interval trees. Thus the space complexity will likely be much less than $n^m$. In the worst case, the time complexity of the method is on the order of (m log n). The time complexity, as described above, depends on the tree-structure used, such as a balanced binary or red-black tree structure.

Any of the data classification properties could serve as the first data classification property for which a tree is generated. However, the determination of the first data classification property can be made by examining the real-world usage of the filters. Thus the first property can be chosen to minimize the complexity of the overall tree structure. For example, it might be the case that there are a small number of protocol values that will be used. Choosing protocol value as the starting data classification property may then reduce the size and complexity of the tree structure as compared to a tree in which the starting data classification property encompassed more non-overlapping ranges.

Other embodiments are also within the scope of the invention.

What is claimed is:

1. A computer-implemented method of data packet classification comprising:

receiving a data packet comprising one or more classification properties;

determining an interval using a computer, from a non-overlapping interval tree representing applicability of rules to a first data packet classification property that matches the first of the one or more classification properties of the data packet;

producing packet classification information by classifying the data packet based on the rules that apply to the determined interval;

for each interval for which the number of applicability of rules exceeds a threshold, referring to a second non-overlapping interval tree representing applicability of rules to a second data packet classification property; and for each interval for which the number of applicability of rules does not exceed the threshold, determining the rules that apply for the first property from an ordered list of rules.

2. The method of claim 1, in which one of the properties comprises a source address property.

3. The method of claim 1, in which one of the properties comprises a destination address property.

4. A system comprising:

a network device configured to manage flow of a data packet on a network, wherein the data packet comprises one or more data packet classification properties;

a rule module comprising a packet classification rule set;

a packet classification module configured to compare the one or more data packet classification properties to the rule set, the packet classification module including a tree of non-overlapping intervals representing the applicability of the rule set to ranges of the one or more data packet classification properties;

a second tree of non-overlapping intervals representing the applicability of the rule set to ranges of a second data packet property; and an iterative analyzer for analyzing the applicability of the rule set to a first data packet property for packets where the number of rules applicable to the first property does not exceed a threshold value.

5. A computer-implemented method comprising:

generating non-overlapping intervals, using a computer, representing applicability of rules to a first data packet classification property;

for each interval for which the number of applicability of rules exceeds a threshold, generating non-overlapping intervals representing the applicability of the rules to a second data packet classification property; and for each interval for which the number of applicability of the rules does not exceed the threshold, generating a list of the applicability of rules to the first data packet classification property.

6. The method of claim 5, including searching a binary tree of non-overlapping intervals.

7. The method of claim 5, also including searching a red-black tree of non-overlapping intervals.

8. The method of claim 5, also including regenerating non-overlapping intervals when the rules change.

* * * * *